US012372671B2

(12) United States Patent
Kawata et al.

(10) Patent No.: US 12,372,671 B2
(45) Date of Patent: Jul. 29, 2025

(54) RADIATION DETECTION DEVICE, RADIATION DIAGNOSTIC DEVICE, RADIATION DETECTION METHOD, AND COMPUTER PROGRAM PRODUCT

(71) Applicant: CANON MEDICAL SYSTEMS CORPORATION, Tochigi (JP)

(72) Inventors: Go Kawata, Moriya (JP); Manabu Teshigawara, Otawara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 170 days.

(21) Appl. No.: 18/060,006

(22) Filed: Nov. 30, 2022

(65) Prior Publication Data

US 2023/0168395 A1    Jun. 1, 2023

(30) Foreign Application Priority Data

Dec. 1, 2021   (JP) .................................. 2021-195169

(51) Int. Cl.
*G01T 1/22*   (2006.01)
*G01T 1/29*   (2006.01)

(52) U.S. Cl.
CPC .............. *G01T 1/22* (2013.01); *G01T 1/2907* (2013.01)

(58) Field of Classification Search
CPC ........ G01T 1/22; G01T 1/2907; G01T 1/2985
See application file for complete search history.

(56) References Cited

U.S. PATENT DOCUMENTS

| | | | |
|---|---|---|---|
| 2004/0227091 A1 | 11/2004 | Leblanc et al. | |
| 2011/0163236 A1 | 7/2011 | Arodzero | |
| 2019/0243010 A1* | 8/2019 | Ota | ............................ G01T 1/29 |
| 2019/0324161 A1* | 10/2019 | Ota | ........................ G01T 1/2985 |
| 2020/0326438 A1 | 10/2020 | Ota et al. | |
| 2021/0236073 A1* | 8/2021 | Kawata | ................... A61B 6/037 |
| 2022/0065803 A1* | 3/2022 | Kawata | ................... A61B 6/037 |
| 2022/0381928 A1* | 12/2022 | Kawata | .................... G01T 1/242 |

FOREIGN PATENT DOCUMENTS

| | | |
|---|---|---|
| JP | 2004-340968 A | 12/2004 |
| JP | 2017-191086 A | 10/2017 |
| JP | 2022-40010 A | 3/2022 |

* cited by examiner

*Primary Examiner* — David P Porta
*Assistant Examiner* — Gisselle M Gutierrez
(74) *Attorney, Agent, or Firm* — Oblon, McClelland, Maier & Neustadt, L.L.P.

(57) ABSTRACT

A radiation detection device according to an embodiment includes a scintillator and a processing circuit. The processing circuit measures transferred energy when scintillation is caused after a gamma ray incident on a scintillator generates Cherenkov light and estimates a Cherenkov angle based on the transferred energy.

9 Claims, 11 Drawing Sheets

RADIATION DETECTION DEVICE, RADIATION DIAGNOSTIC DEVICE, RADIATION DETECTION METHOD, AND COMPUTER PROGRAM PRODUCT

CROSS-REFERENCE TO RELATED APPLICATIONS

This application is based upon and claims the benefit of priority from Japanese Patent Application No. 2021-195169, filed on Dec. 1, 2021; the entire contents of which are incorporated herein by reference.

FIELD

Embodiments described herein relate generally to a radiation detection device, a radiation diagnostic device, a radiation detection method, and a computer program product.

BACKGROUND

A radiation detector for a PET device can estimate a radiation angle (Cherenkov angle) of Cherenkov light based on a propagation trajectory of the Cherenkov light generated in a Cherenkov radiator (radiator), and specify a generation position of the Cherenkov light based on the estimated radiation angle.

The Cherenkov angle depends on transferred energy given to the radiator by a gamma ray. Herein, the energy given to the radiator by the gamma ray is considered to be about 511 keV, which is pair annihilation gamma ray energy, but is not necessarily equal to 511 keV because there is Compton scattering in the interaction between gamma rays and the radiator. As a result, an error is caused in the Cherenkov angle, and as a result, an error may also be caused in the generation position of the Cherenkov light in some cases.

DETAILED DESCRIPTION

A radiation detection device provided in one aspect of the present invention includes a scintillator and a processing circuit. The processing circuit measures transferred energy when scintillation is caused after a gamma ray incident on a scintillator generates Cherenkov light, and estimates a Cherenkov angle based on the transferred energy.

The following describes an embodiment of the radiation detection device, a radiation diagnostic device, a radiation detection method, and a computer program product in detail with reference to the drawings.

Figure 1:
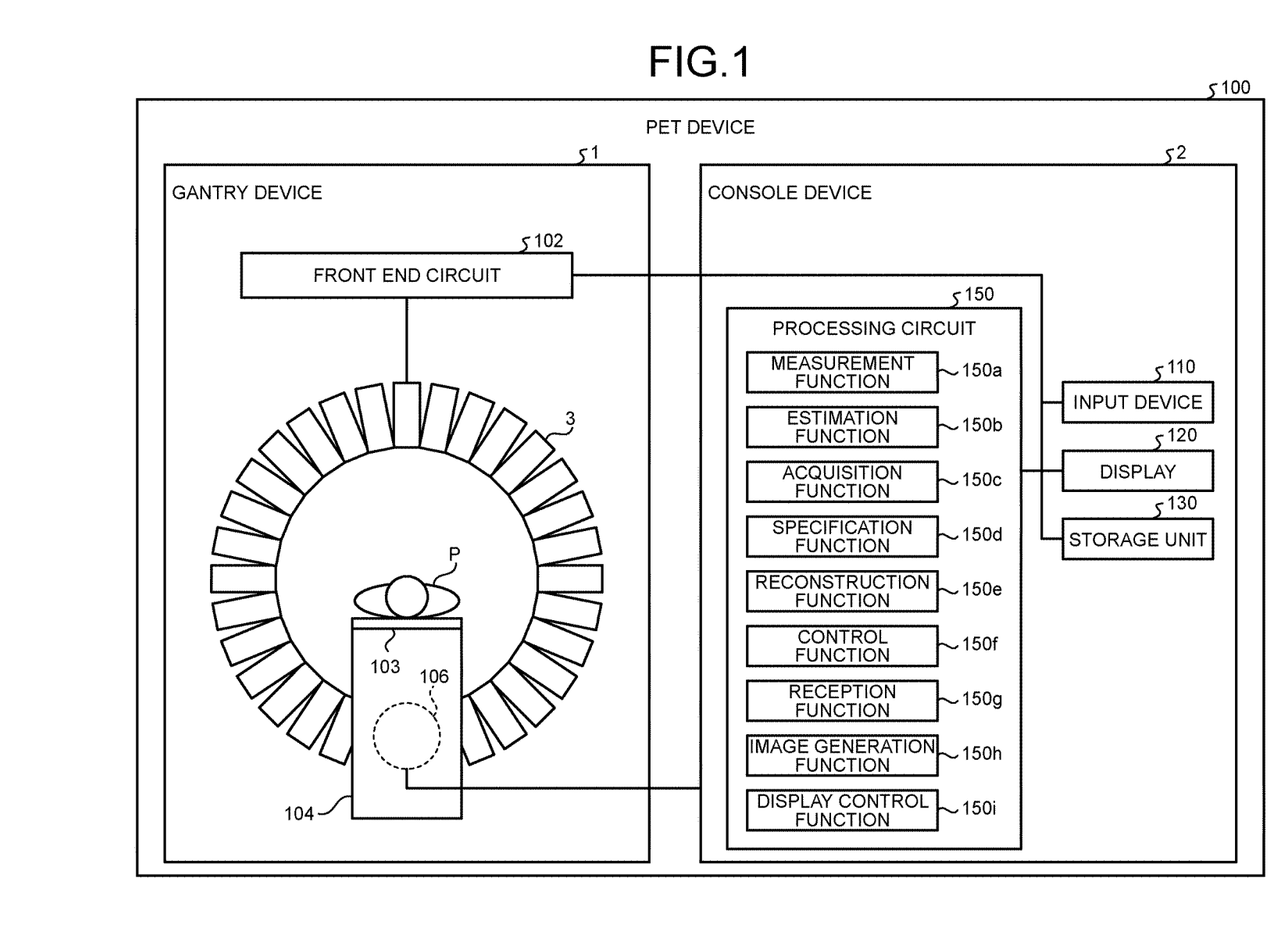
FIG. 1 is a diagram illustrating an example of a radiation diagnostic device according to an embodiment.

FIG. 1 is a diagram illustrating a configuration of a PET device 100 as the radiation diagnostic device including the radiation detection device according to the embodiment. As illustrated in FIG. 1, the PET device 100 according to the embodiment includes a gantry device 1 and a console device 2. The gantry device 1 includes detectors 3, a front end circuit 102, a couchtop 103, a couch 104, and a couch driving unit 106.

Each of the detectors 3 is a detector that detects radiation by detecting scintillation light (fluorescence) as light that is re-emitted at the time when a substance in an excited state makes a transition to a ground state again, the substance being excited when annihilation gamma rays, which are generated due to pair annihilation of a positron emitted from an agent administered to and accumulated in a subject P and an electron in a surrounding tissue, interact with a light emitting body. In the embodiment, the detector 3 can detect Cherenkov light. The detector 3 detects energy information on radiation of annihilation gamma rays that are generated due to pair annihilation of a positron emitted from an agent administered to and accumulated in the subject P and an electron in a surrounding tissue. A plurality of the detectors 3 are disposed to surround the subject P in a ring shape, constituting a plurality of detector blocks, for example. A configuration of the detector 3 will be described later in detail.

The gantry device 1 generates counting information from output signals of the detectors 3 by the front end circuit 102, and stores the generated counting information in storage unit 130 of the console device 2. The detectors 3 are divided into a plurality of blocks, and include the front end circuit 102.

The front end circuit 102 converts the output signals of the detectors 3 into digital data, and generates the counting information. The counting information includes a detection position, an energy value, and a detection time of an annihilation gamma ray. For example, the front end circuit 102 specifies a plurality of light detection elements that have converted scintillation light into electric signals at the same timing. The front end circuit 102 then specifies a scintillator number (P) indicating a position of a scintillator on which an annihilation gamma ray is incident. The position of the scintillator on which an annihilation gamma ray is incident may be specified by performing center-of-gravity calculation based on the position of each light detection element and strength of the electric signal. In a case in which the scintillator corresponds to an element size of each light detection element, for example, the scintillator corresponding to the light detection element from which a maximum output has been obtained is assumed to be the position of the scintillator on which an annihilation gamma ray is incident, and is finally specified while considering scattering between scintillators.

The front end circuit 102 performs integral calculation of strength of the electric signal output from each light detection element, or measures a time at which the electric signal strength exceeds a threshold (Time over Threshold), and specifies an energy value (E) of the annihilation gamma ray incident on each of the detectors 3. The front end circuit 102 specifies a detection time (T) at which scintillation light caused by an annihilation gamma ray is detected by the detector 3. The detection time (T) may be an absolute time, or may be an elapsed time from a start point of imaging. In this way, the front end circuit 102 generates the counting information including the scintillator number (P), the energy value (E), and the detection time (T).

The front end circuit 102 is implemented by, for example, a central processing unit (CPU), a graphical processing unit (GPU), or a circuit such as an application specific integrated circuit (ASIC) and a programmable logic device (for example, a simple programmable logic device (SPLD), a complex programmable logic device (CPLD), and a field programmable gate array (FPGA)). The front end circuit 102 is an example of a front end unit.

The couchtop 103 is a bed on which the subject P is placed, the couchtop 103 being disposed on the couch 104. The couch driving unit 106 moves the couchtop 103 under control by a control function 150*f* of a processing circuit 150. For example, the couch driving unit 106 moves the subject P into an imaging port of the gantry device 1 by moving the couchtop 103.

The console device 2 receives an operation of the PET device 100 by an operator, controls photographing of a PET image, and reconstructs the PET image using the counting information collected by the gantry device 1. As illustrated in FIG. 1, the console device 2 includes the processing circuit 150, an input device 110, a display 120, and a storage unit 130. Respective parts included in the console device 2 are connected to each other via a bus. Details of the processing circuit 150 will be described later.

The input device 110 is a mouse, a keyboard, and the like used for inputting various instructions and various settings by the operator of the PET device 100, and gives the input various instructions and various settings to the processing circuit 150. For example, the input device 110 is used for inputting an instruction for starting imaging.

The display 120 is a monitor or the like viewed by the operator, and displays a respiration waveform or a PET image of the subject, or displays a graphical user interface (GUI) for receiving various instructions and various settings from the operator, under control by the processing circuit 150.

The storage unit 130 stores various kinds of data used in the PET device 100. The storage unit 130 includes a memory, for example, and implemented by a semiconductor memory element such as a random access memory (RAM) and a flash memory, a hard disk, an optical disc, and the like, by way of example. The storage unit 130 stores the counting information as information in which the scintillator number (P), the energy value (E), and the detection time (T) are associated with each other, simultaneous counting information in which a group of the counting information is associated with a coincidence number as a serial number of the simultaneous counting information, projection data obtained by totalizing the simultaneous counting information, a reconstructed PET image, and the like.

The processing circuit 150 includes a measurement function 150*a*, an estimation function 150*b*, an acquisition function 150*c*, a specification function 150*d*, a reconstruction function 150*e*, a control function 150*f*, a reception function 150*g*, an image generation function 150*h*, and a display control function 150*i*. Respective functions including the measurement function 150*a*, the estimation function 150*b*, the acquisition function 150*c*, and the specification function 150*d* will be described later in detail.

In the embodiment, respective processing functions executed by the measurement function 150*a*, the estimation function 150*b*, the acquisition function 150*c*, the specification function 150*d*, the reconstruction function 150*e*, the control function 150*f*, the reception function 150*g*, the image generation function 150*h*, and the display control function 150*i* are stored in the storage unit 130 in a form of a computer program executable by a computer. The processing circuit 150 is a processor that reads out computer programs from the storage unit 130 and executes them to implement a function corresponding to each computer program. In other words, the processing circuit 150 that has read out each computer program is assumed to have each function illustrated in the processing circuit 150 in FIG. 1.

In FIG. 1, the single processing circuit 150 is assumed to implement the processing functions executed by the measurement function 150*a*, the estimation function 150*b*, the acquisition function 150*c*, the specification function 150*d*, the reconstruction function 150*e*, the control function 150*f*, the reception function 150*g*, the image generation function 150*h*, and the display control function 150*i*. Alternatively, the processing circuit 150 may be configured by combining a plurality of independent processors, and the functions may be implemented by executing the computer programs on the respective processors. In other words, each of the functions described above may be configured as a computer program, and the one processing circuit 150 may execute each computer program. As another example, a specific function may be implemented in a dedicated independent program execution circuit.

A word of "processor" used in the above description means, for example, a central processing unit (CPU), a graphical processing unit (GPU), or a circuit such as an application specific integrated circuit (ASIC) and a programmable logic device (for example, a simple programmable logic device (SPLD), a complex programmable logic device (CPLD), and a field programmable gate array (FPGA)). The processor implements the functions by reading out and executing the computer programs stored in the storage unit 130.

In FIG. 1, the measurement function 150*a*, the estimation function 150*b*, the acquisition function 150*c*, the specification function 150*d*, the reconstruction function 150*e*, the control function 150*f*, the reception function 150*g*, the image generation function 150*h*, and the display control function 150*i* are examples of a measurement unit, an estimation unit, an acquisition unit, a specification unit, a reconstruction unit, a control unit, a reception unit, an image generation unit, and a display control unit, respectively.

In place of the processing circuit 150, the front end circuit 102 may perform processing of the measurement unit, the estimation unit, the acquisition unit, the specification unit, and the like.

The processing circuit 150 performs reconstruction of the PET image based on data acquired from the front end circuit 102 by the reconstruction function 150e, and performs generation of an image by the image generation function 150h.

The processing circuit 150 performs overall control of the PET device 100 by controlling the gantry device 1 and the console device 2 by the control function 150f. For example, the processing circuit 150 controls, by the control function 150f, imaging by the PET device 100. The processing circuit 150 controls the couch driving unit 106 by the control function 150f.

The processing circuit 150 receives an input of information from a user through the input device 110 by the reception function 150g. The processing circuit 150 causes the display 120 to display data of the PET image and the like by the display control function 150i.

Subsequently, the following describes a configuration of the detector 3 according to the embodiment with reference to FIG. 2 to FIG. 6.

Figure 2:
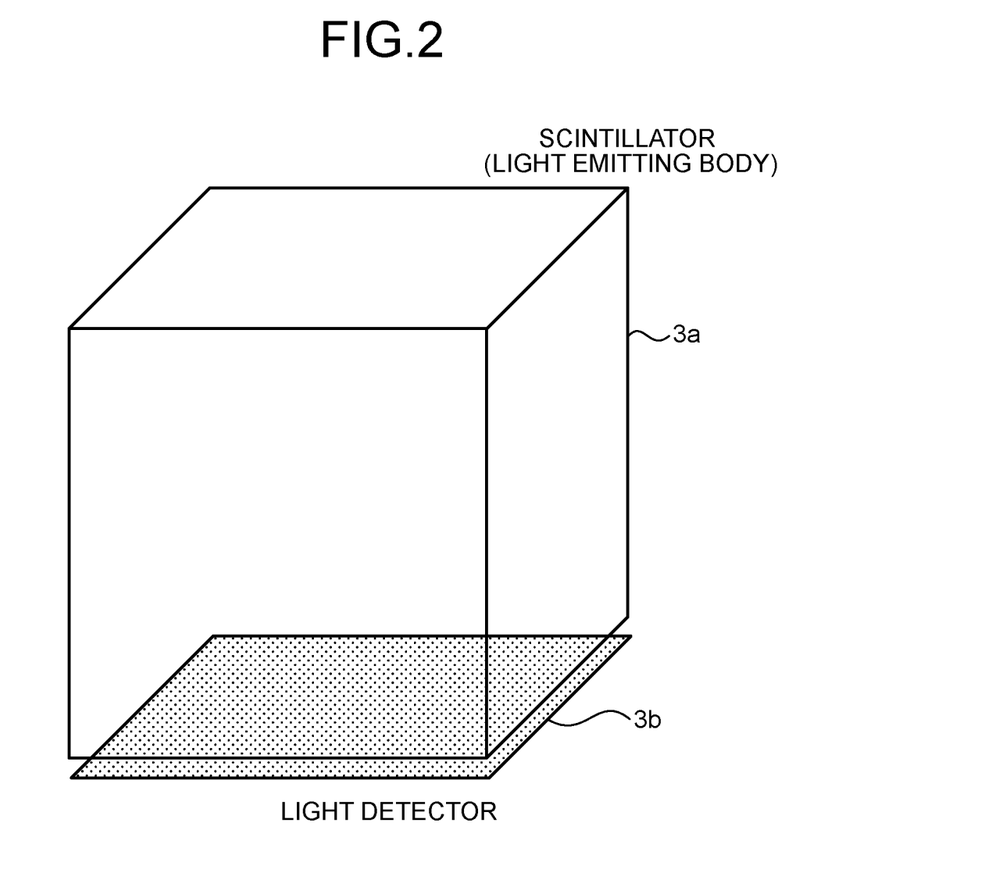
FIG. 2 is a diagram illustrating an example of a detector of a radiation detection device according to the embodiment.

FIG. 2 illustrates an example of the detector 3 according to the embodiment. The detector 3 includes a scintillator crystal 3a and a light detection face 3b including a light detection element. In the embodiment, resolving of detection position independent of a crystal size can be achieved, and both ends of a line of response (LOR) can be estimated by processing of estimating a light emission point (described later), and also by considering a sub-crystal level, that is, by considering which position in the crystal the light emission occurred at. That is, the LOR can be identified using continuous coordinates, and estimation accuracy for the pair annihilation point can be improved. The embodiment is not limited to the example illustrated in FIG. 2. For example, the scintillator crystal 3a may be a monolithic crystal, and light detection faces including light detection elements may be disposed on six surfaces of the scintillator crystal, for example.

As a material of the scintillator crystal 3a, for example, a material appropriate for generating Cherenkov light, for example, bismuth germanium oxide (BGO), or a lead compound such as lead glass ($SiO_2$+PbO), lead fluoride ($PbF_2$), and PWO ($PbWO_4$) can be used. As other examples, for example, a scintillator crystal such as lutetium yttrium oxyorthosilicate (LYSO), lutetium oxyorthosilicate (LSO), lutetium gadolinium oxyorthosilicate (LGSO), BGO, and the like may be used. The light detection element included in the light detection face 3b is constituted of a plurality of pixels, for example, and each of the pixels is constituted of a single photon avalanche diode (SPAD), for example. The configuration of the detector 3 is not limited to the example described above. By way of example, a silicon photomultiplier (SiPM) or a photomultiplier tube may be used as the light detection element, for example.

Figure 3:
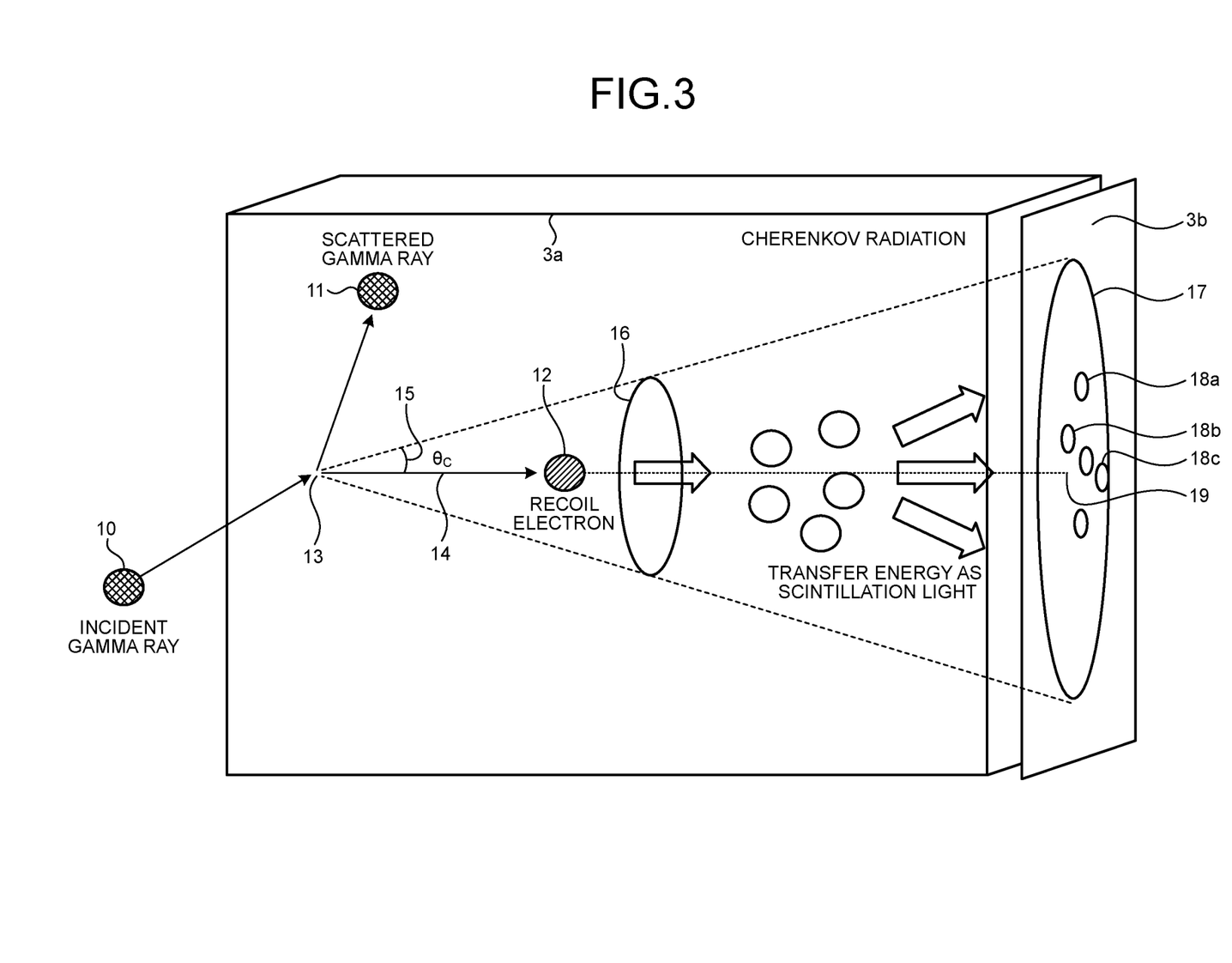
FIG. 3 is a diagram for explaining the radiation detection device according to the embodiment.

The following describes Cherenkov light and scintillation light detected by the detector 3 with reference to FIG. 3. As illustrated in FIG. 3, a scattered gamma ray 11 and a recoil electron 12 as a charged particle are generated when an incident gamma ray 10, which is one of pair annihilation gamma rays that are generated due to pair annihilation of a positron emitted from an agent administered to and accumulated in the subject P and an electron in a surrounding tissue, interacts with a light emitting body (radiator) included in the scintillator crystal 3a. Among the scattered gamma ray 11 and the recoil electron 12, the generated recoil electron 12 as the charged particle moves at a higher velocity than a phase velocity of light in a medium in the scintillator crystal 3a, and thereby Cherenkov light 16 as light of a shock wave is generated. The light detection face 3b detects the Cherenkov light 16 as a Cherenkov ring 17 expanding in an elliptic shape centered on a point 19 as an intersection point of the light detection face 3b and a traveling direction of the recoil electron 12 as the charged particle. Cherenkov light is generated in a shorter time than scintillation light is, so that Cherenkov light has a favorable response characteristic and is advantageous in view of time resolution in estimating the LOR.

On the other hand, the recoil electron 12 causes various interactions with the scintillator crystal 3a thereafter, and gives energy to the scintillator crystal 3a as scintillation light. The light detection face 3b detects the scintillation light as pieces of position distribution information 18a, 18b, 18c, and so on of scintillation events.

Figure 4:
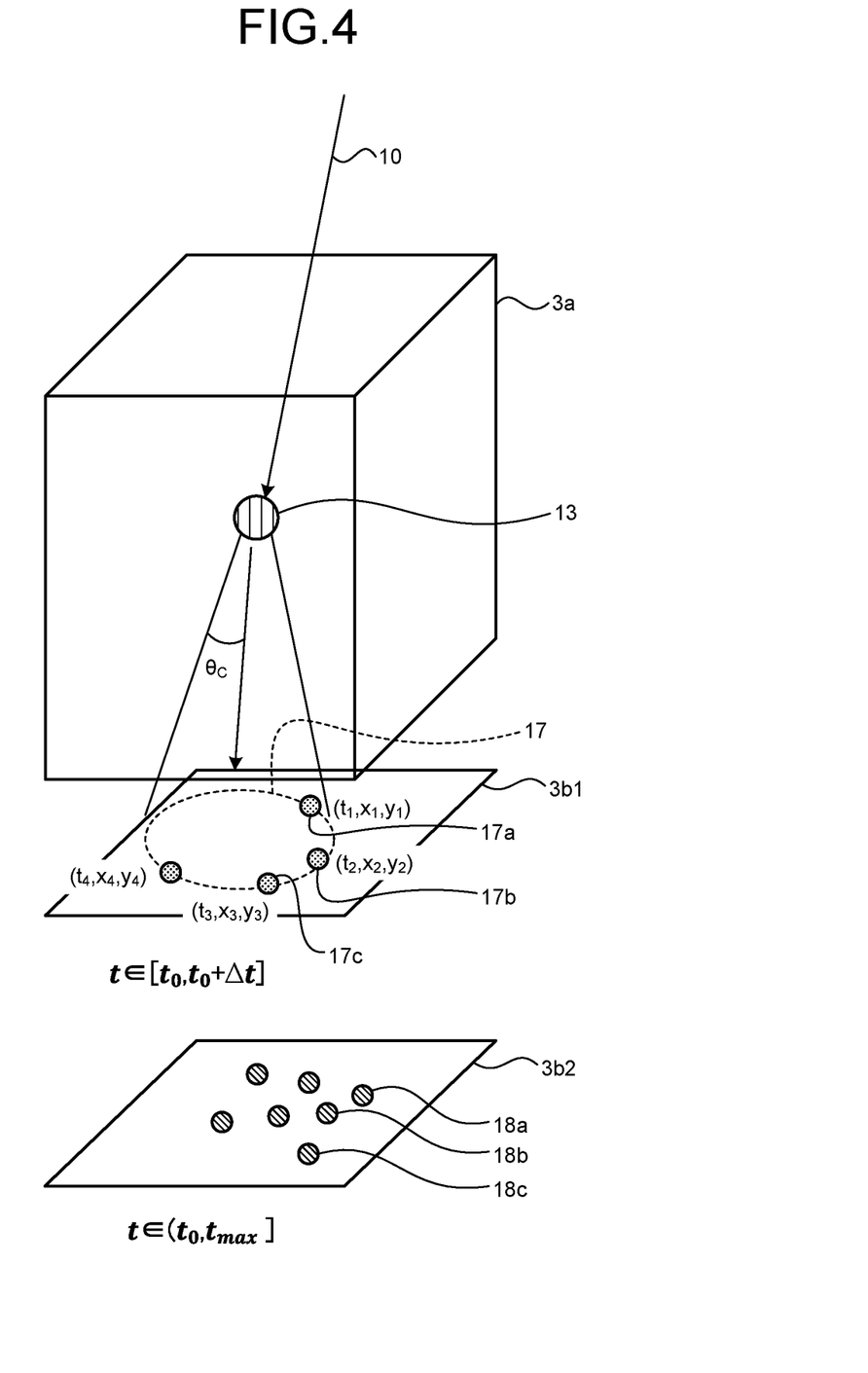
FIG. 4 is a diagram for explaining the radiation detection device according to the embodiment.

The following describes a Cherenkov event and a scintillation event detected by the detector 3 with reference to FIG. 4. Cherenkov radiation distribution 3b1 indicates Cherenkov events among events detected by the light detection face 3b. Assuming that an estimated time of a time when the charged particle is generated is $t_0$, the light detection face 3b detects, as pieces of position distribution information 17a, 17b, and 17c related to the Cherenkov events, detected events that have been detected in a period from the time $t_0$ to $t_0+\Delta t$. Herein, at is a time corresponding to a time from when the charged particle is generated until the Cherenkov light reaches the light detection face 3b, for example, about 100 ps. On the other hand, scintillation light distribution 3b2 indicates scintillation events among the events detected by the light detection face 3b. In a case of the scintillation events, the light detection face 3b detects, as pieces of position distribution information 18a, 18b, 18c, and so on related to the scintillation events, detected events that have been detected at a time on or after the estimated time $t_0$ of the time at which the charged particle is generated.

Figure 5:
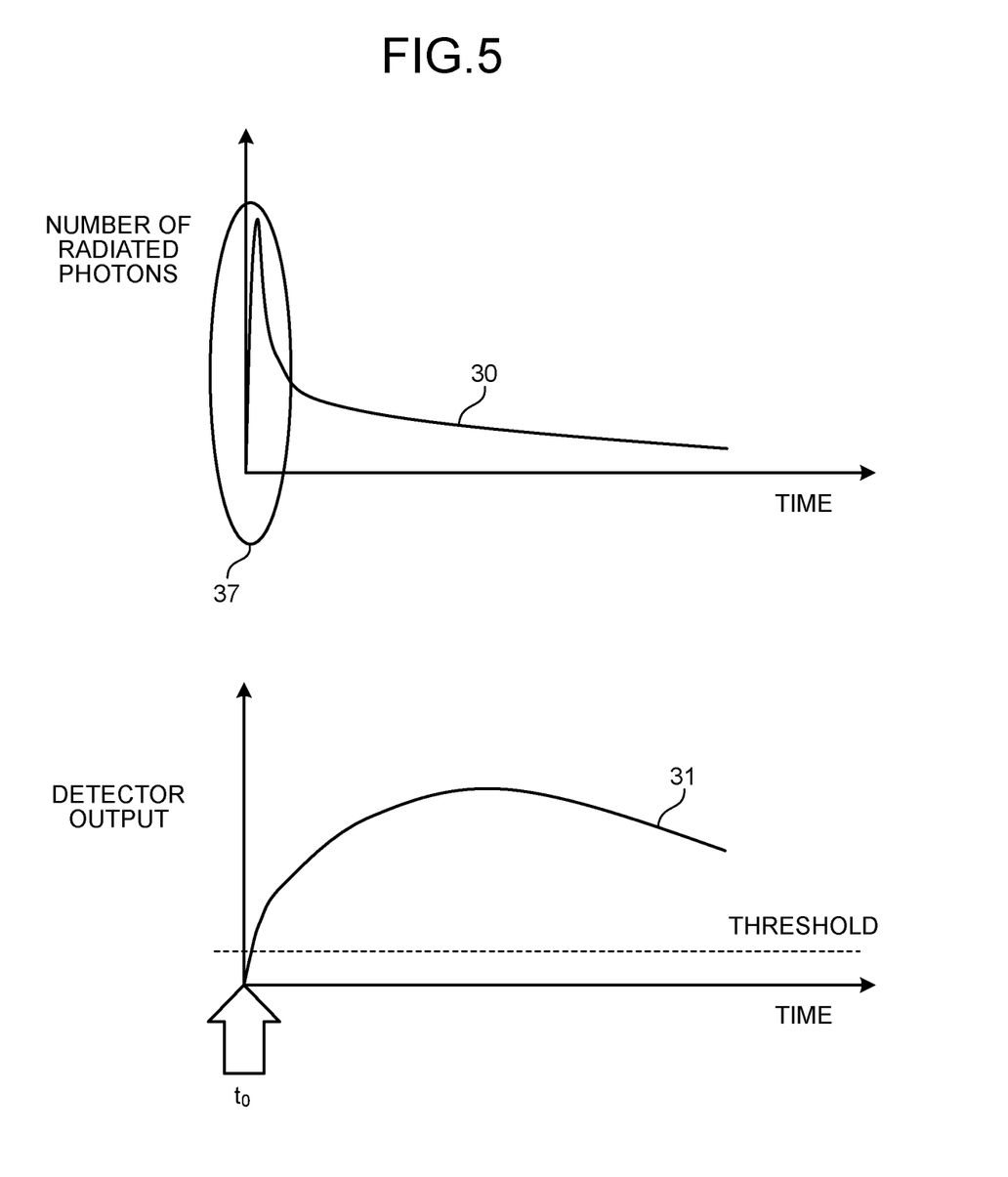
FIG. 5 is a diagram for explaining processing performed by the radiation detection device according to the embodiment.

FIG. 5 illustrates an example of temporal changes in the number of radiated photons detected by the detector 3 and a detector output. A graph 30 indicates an outline of temporal changes in the number of radiated photons detected by the light detection face 3b. Of the radiated photons, the radiated photons immediately after the charged particle is generated, such as the radiated photons indicated in a region 37, are considered to be components derived from the Cherenkov light. On the other hand, the rest are considered to be components derived from the scintillation light. A detector output signal 31 indicates temporal changes in the detector output on the light detection face 3b. In the detector output, components immediately after the charged particle is generated mainly include components derived from the Cherenkov light, and components after time has elapsed after the charged particle is generated mainly include scintillation components.

Subsequently, returning to FIG. 4, the following describes a method of estimating a charged particle generation position from the detected Cherenkov events. The Cherenkov ring 17 generated from the pieces of position distribution information 17a, 17b, 17c, and so on related to the Cherenkov events is a cross section of a cone having an apex that is a generation point 13 of the charged particle, an axis along a traveling direction of the charged particle, and an angle formed with the axis being a Cherenkov angle $\theta_C$. At this point, regarding the Cherenkov angle $\theta_C$, the following expression (1) is established.

$$\cos\theta_c = \frac{1}{n\beta} \quad (1)$$

Herein, n is a medium of the scintillator crystal 3a, and β is a ratio of a velocity of the charged particle to the velocity of light, which is represented by the following expression (2).

$$\beta = \frac{v}{c} = \sqrt{1 - \frac{1}{\left(\frac{E_e}{m_0 c^2} + 1\right)^2}} \quad (2)$$

Herein, v is the velocity of the charged particle (recoil electron), c is the velocity of light, $m_0$ is a rest mass of the electron, and $E_e$ is energy of the charged particle. Herein, the ratio β of the velocity of the charged particle to the velocity of light is determined by the expression (2) when the energy of the charged particle is given, so that the Cherenkov angle $\theta_C$ can be calculated by substituting the ratio β into a right side of the expression (1).

Conventionally, for example, there has been a case in which the Cherenkov angle $\theta_C$ is calculated with the energy $E_e$ of the charged particle assumed to be constant irrespective of detected events, for example, 511 keV. However, when the energy of the charged particle is deviated from an actual value in calculating the Cherenkov angle $\theta_C$, the Cherenkov angle $\theta_C$ becomes incorrect, and as a result, an error may be caused in estimation of the light emission point in some cases.

Figure 6:
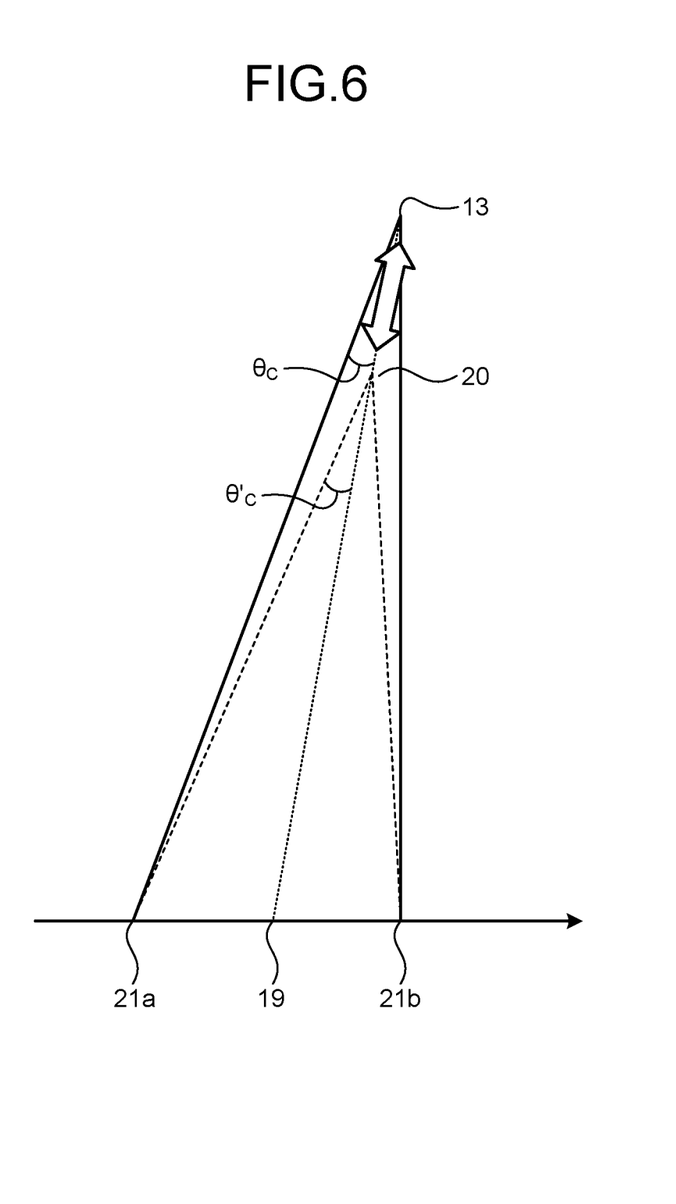
FIG. 6 is a diagram for explaining a background regarding the embodiment.

FIG. 6 is a diagram illustrating a relation between the Cherenkov angle and the charged particle generation position. FIG. 6 illustrates the sectional view of the light cone of the Cherenkov light including a long axis of the Cherenkov ring 17. Points 21a and 21b are points constituting the long axis of the Cherenkov ring 17, and the point 19 is a center point of the Cherenkov ring. Herein, when the Cherenkov angle $\theta_C$ is correctly calculated, the generation point 13 of the charged particle is also correctly calculated. However, when there is an error in a calculated Cherenkov angle $\theta'_C$ due to an error in calculation of the energy $E_e$ of the charged particle, an error is caused also in an estimated point 20 of the generation point of the charged particle.

Actually, the energy given to the detector 3 by a gamma ray is generally considered to be about 511 keV that is pair annihilation gamma ray energy, but is not necessarily equal to 511 keV because there is Compton scattering in the interaction between gamma rays and the scintillator crystal. As a result, if the energy given to the detector 3 by the gamma ray is considered to be always 511 keV, an error may be caused in the Cherenkov angle, and as a result, an error may be caused also in the Cherenkov light generation position in some cases.

In view of such background, in the radiation detection device according to the embodiment, the processing circuit 150 measures, by the measurement function 150a, transferred energy when scintillation is caused after a gamma ray incident on a scintillator generates Cherenkov light, and estimates the Cherenkov angle based on the transferred energy by the estimation function 150b. Accordingly, estimation accuracy for the charged particle generation position can be improved, and image quality can be improved.

Figure 7:
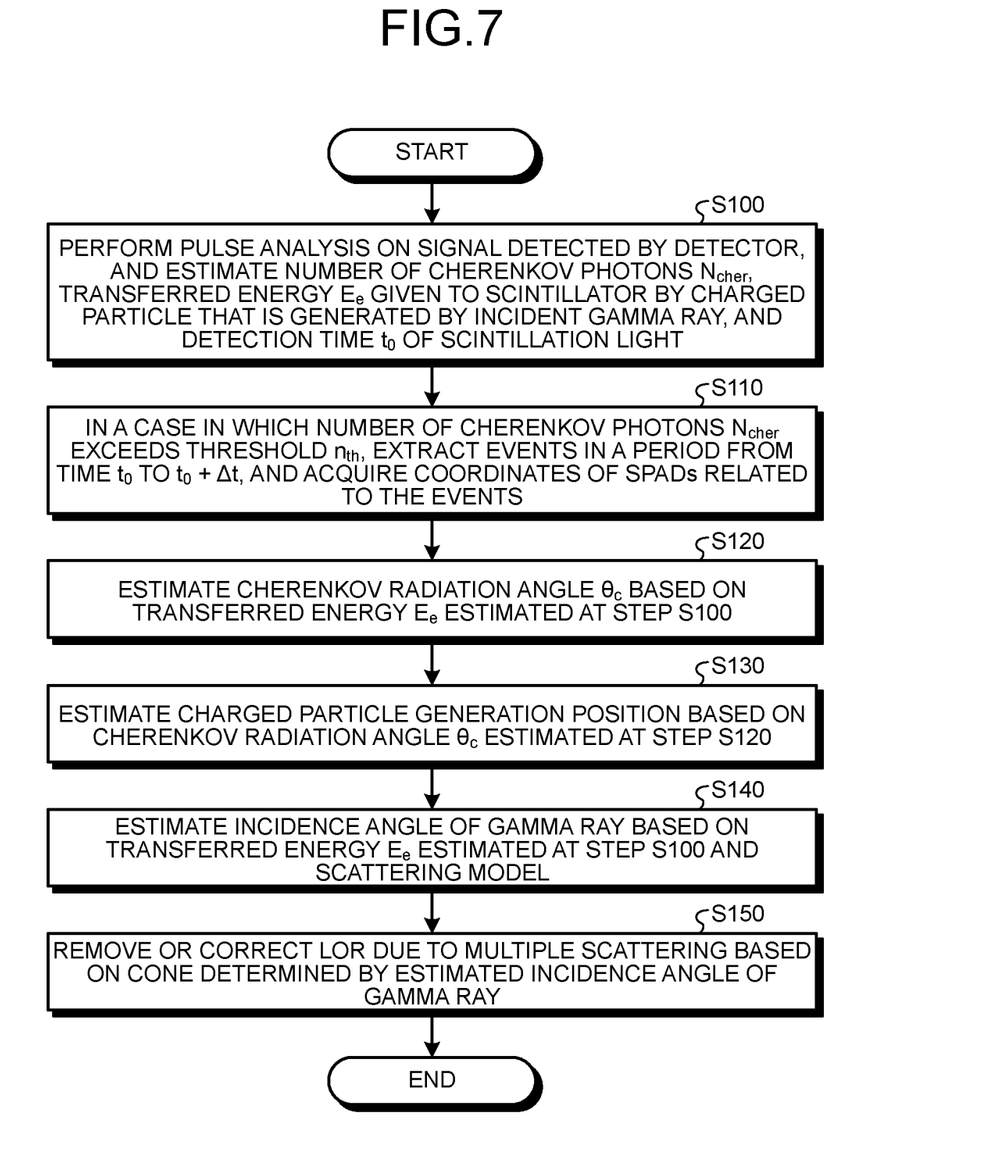
FIG. 7 is a flowchart for explaining a processing procedure performed by the radiation detection device according to the embodiment.

The following describes such a configuration with reference to FIG. 7 while appropriately referring to FIGS. 8 to 12.

First, at Step S100, the processing circuit 150 performs, by the measurement function 150a, pulse analysis on a signal detected by the detector, and estimates the number of Cherenkov photons $N_{Cher}$, transferred energy $E_e$ transferred to the scintillator by the charged particle generated by the incident gamma ray, and the detection time $t_0$ of the scintillation light.

Figure 8:
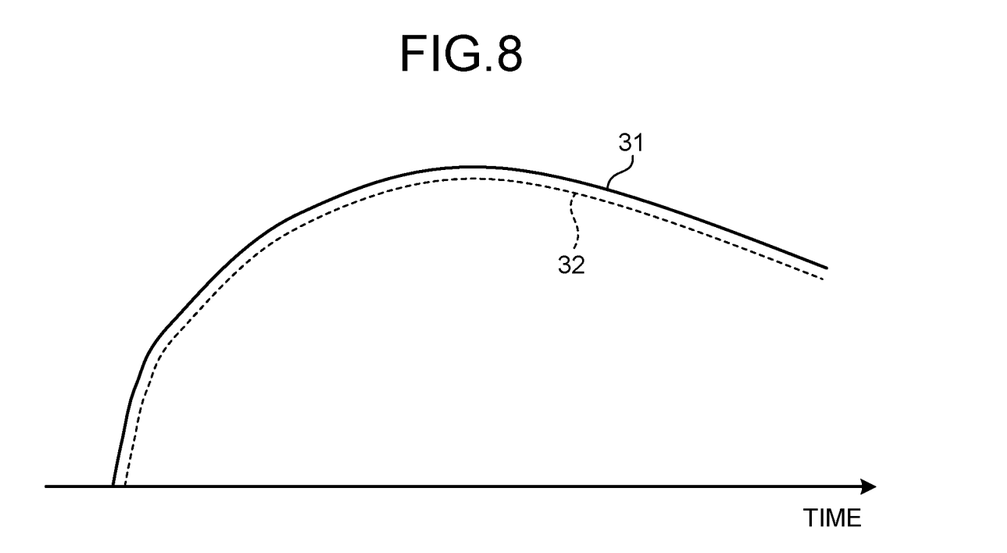
FIG. 8 is a diagram for explaining processing performed by the radiation detection device according to the embodiment.
Figure 9:
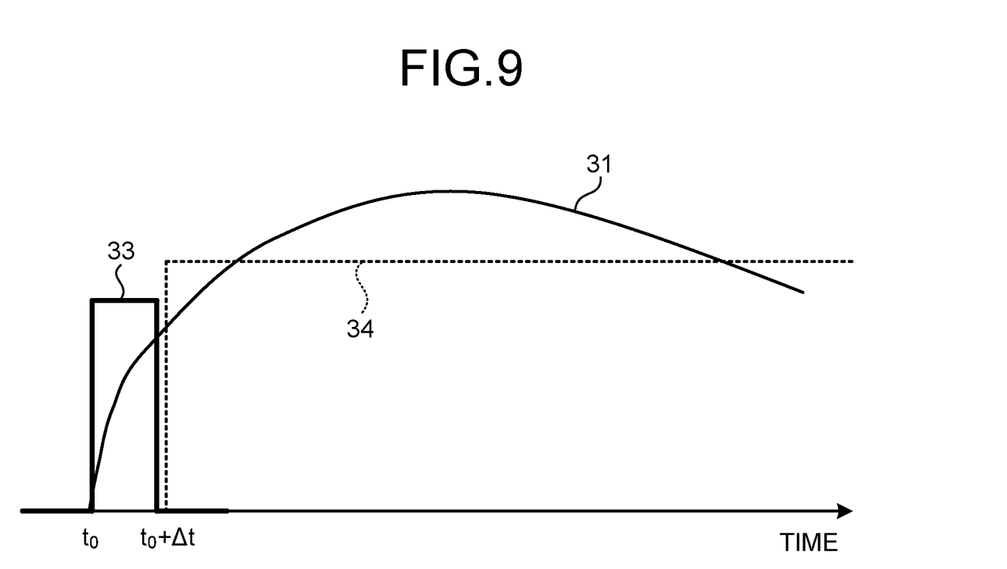
FIG. 9 is a diagram for explaining processing performed by the radiation detection device according to the embodiment.

An example of such pulse analysis is illustrated in FIG. 8 and FIG. 9. As a first example of a method of pulse analysis, as illustrated in FIG. 8, the processing circuit 150 calculates, by the measurement function 150a, the number of Cherenkov photons $N_{Cher}$ by performing fitting the detector output signal 31 acquired from the detector 3 through the front end circuit 102 as a function of time to a theoretical curve 32. The processing circuit 150 measures, by the measurement function 150a, the transferred energy $E_e$ at the time when the gamma ray is incident on the scintillator crystal 3a to generate Cherenkov light and then scintillation is caused, based on a result of the fitting.

As an example, it can be considered that a theoretical curve I of the detector output signal 31 can be represented as a sum of a detector output signal $I_1$ derived from the Cherenkov light and the detector output signal $I_2$ derived from the scintillation light. Thus, theoretical curve $I = aI_1 + bI_2$ is established using a and b as parameters, and the processing circuit 150 performs parameter estimation for the detector output signal 31 using the theoretical curve by the measurement function 150a, for example. Subsequently, the processing circuit 150 separates, by the measurement function 150a, the detector output signal 31 into components of the detector output signal derived from the Cherenkov light and components of the detector output signal derived from the scintillation light, and extracts the components of the detector output signal derived from the Cherenkov light and the components of the detector output signal derived from the scintillation light. The processing circuit 150 estimates the number of Cherenkov photons $N_{Cher}$ by the estimation function 150b based on the extracted components of the detector output signal derived from the Cherenkov light. On the other hand, the processing circuit 150 estimates, by the measurement function 150a, the transferred energy $E_e$ at the time when scintillation is caused based on the extracted components of the detector output signal derived from the scintillation light. The processing circuit 150 estimates the detection time $t_0$ of the scintillation light based on a time when the detector output signal 31 first exceeds a threshold.

As another example, the processing described above may be performed by machine learning. That is, a pre-trained model generated by machine learning receives the detector output signal as an input, and outputs the number of Cherenkov photons $N_{Cher}$, the transferred energy $E_e$, and the detection time $t_0$. The processing circuit 150 inputs the detector output signal 31 to the pre-trained model by the measurement function 150a to calculate the number of Cherenkov photons $N_{Cher}$, the transferred energy $E_e$, and the detection time $t_0$. Training of the pre-trained model is performed by using a large number of pieces of training data in which the detector output signal is associated with the number of Cherenkov photons $N_{Cher}$, the transferred energy $E_e$, and the detection time $t_0$.

As a second example of the method of pulse analysis, as illustrated in FIG. 9, there is a method of integrating a waveform using a plurality of integration gates. In FIG. 9, a gate 33 is a first integration gate for extracting Cherenkov components, and extracts signal components of the detector output signal 31 in a period from the time $t_0$ to the time $t_0 + \Delta t$. The processing circuit 150 applies, by the measurement function 150a, the gate 33 to the detector output signal 31, the gate 33 being a first integration gate that extracts signals in a period from the estimated time of the time at which the Cherenkov light is generated to a first time, and estimates the number of Cherenkov photons based on an integrated signal. That is, the processing circuit 150 estimates the number of Cherenkov photons $N_{Cher}$ by the measurement function 150a based on the detector output signal 31 in a period from the estimated time of the time at which the Cherenkov light is generated to the first time.

On the other hand, a gate 34 is a second integration gate for extracting the scintillation components, and extracts signal components of the detector output signal 31 on or after the time $t_0+\Delta t$. The processing circuit 150 applies, by the measurement function 150a, the gate 34 as the second integration gate for extracting signals of the detector output signal 31 on or after the first time, and measures the transferred energy $E_e$ based on an integrated signal. That is, the processing circuit 150 measures the transferred energy $E_e$ based on the detector output signal 31 on or after the first time by the measurement function 150a.

The processing circuit 150 estimates the detection time $t_0$ of the scintillation light based on a time when the detector output signal 31 first exceeds a threshold.

In this way, the processing circuit 150 measures, by the measurement function 150a, the transferred energy at the time when the gamma ray is incident on the scintillator crystal 3a to generate Cherenkov light and then scintillation is caused.

In the above example, described is a case in which the processing circuit 150 performs pulse analysis by the measurement function 150a to estimate the number of Cherenkov photons $N_{Cher}$, the transferred energy $E_e$, the detection time $t_0$ of the scintillation light, and the like at Step S100, but the embodiment is not limited thereto. The front end circuit 102 may perform similar processing.

Subsequently, at Step S110, in a case in which the number of Cherenkov photons $N_{Cher}$ calculated at Step S100 exceeds a threshold $n_{th}$, as illustrated in FIG. 4, the processing circuit 150 extracts, by the acquisition function 150c, events in a period from the time $t_0$ to the time $t_0+\Delta t$ assuming that $\Delta t$ is a value of about 100 ps, for example, and acquires coordinates of light detection elements related to the events. As an example, the processing circuit 150 acquires the coordinates of single photon avalanche diodes (SPADs) related to the events by the acquisition function 150c. In other words, the processing circuit 150 specifies, by the acquisition function 150c, the Cherenkov events to be acquired based on the number of Cherenkov photons $N_{Cher}$ estimated at Step S100 and the time information, thereby acquiring the pieces of position distribution information 17a, 17b, 17c, and so on of the Cherenkov events that are detected when the Cherenkov light is generated. The processing circuit 150 may acquire the pieces of position distribution information 18a, 18b, 18c, and so on of the scintillation events by the acquisition function 150c. In such a case, the processing circuit 150 may recalculate the transferred energy $E_e$ by the acquisition function 150c based on the pieces of position distribution information on the scintillation events.

Subsequently, at Step S120, the processing circuit 150 may estimate a Cherenkov radiation angle $\theta_C$ by the estimation function 150b based on the transferred energy $E_e$ estimated at Step S100 or Step S110. Specifically, the processing circuit 150 estimates, by the estimation function 150b, the Cherenkov radiation angle $\theta_C$ by substituting a value of $\beta$ into the expression (1), the value of $\beta$ being obtained by substituting the transferred energy $E_e$ into the right side of the expression (2).

Subsequently, at Step S130, the processing circuit 150 specifies the charged particle generation position by the specification function 150d based on the coordinates of the Cherenkov events acquired at Step S110 and the Cherenkov radiation angle $\theta_C$ estimated at Step S120. That is, the processing circuit 150 specifies, by the specification function 150d, a radiation point of the Cherenkov light based on the coordinates of the Cherenkov events acquired at Step S110 and the Cherenkov radiation angle $\theta_C$ estimated at Step S120. As an example, the processing circuit 150 estimates, by the specification function 150d, the Cherenkov ring 17 based on the pieces of position distribution information 17a, 17b, 17c, and so on of the Cherenkov events acquired at Step S110, and calculates candidate points for a point to be the radiation point of the Cherenkov light based on the estimated Cherenkov ring 17 and the Cherenkov radiation angle $\theta_C$ estimated at Step S120. Specifically, the candidate points for a point to be the radiation point is a point that can be the radiation point regarded as an apex of a cone spreading at the Cherenkov radiation angle $\theta_C$ having a cross section that matches the Cherenkov ring 17. Such points are typically present at two positions.

Figure 10:
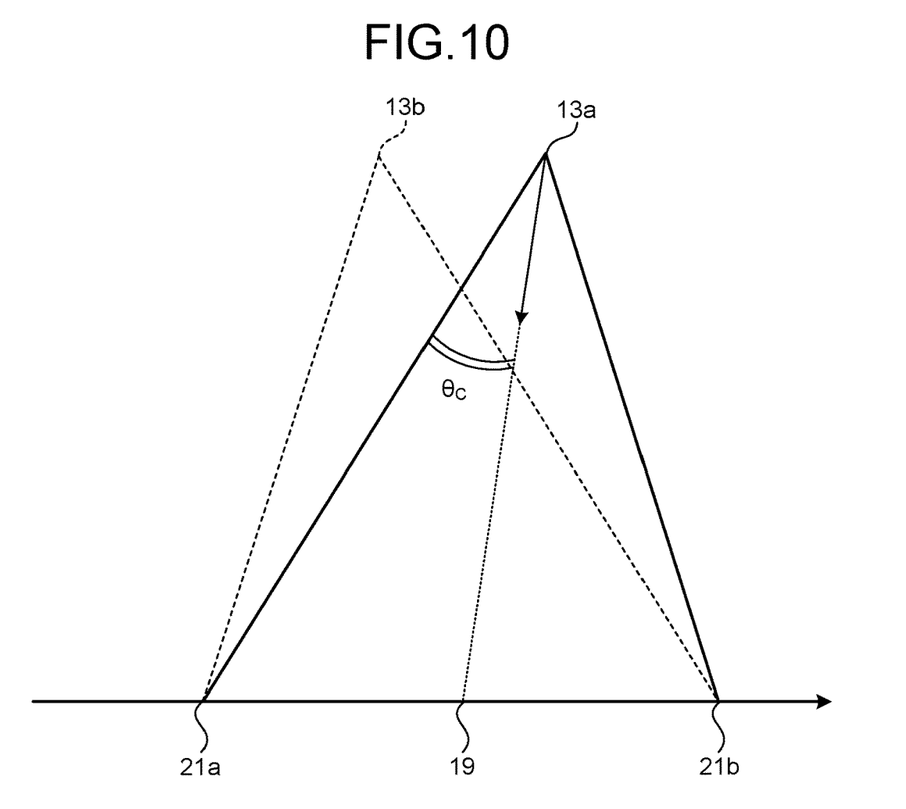
FIG. 10 is a diagram for explaining processing performed by the radiation detection device according to the embodiment.

FIG. 10 illustrates such a situation. FIG. 10 is a diagram in which the Cherenkov event is viewed from a direction vertical to the light detection face 3b. The points 21a and 21b are points configuring the long axis of the Cherenkov ring 17, and the point 19 is the center point of an ellipse of the Cherenkov ring 17. Herein, regarding the candidate points for a point to be the radiation point, for example, a point 13b becomes a candidate for a point to be the radiation point in addition to a point 13a as a true radiation point. The processing circuit 150 selects, by the specification function 150d, the true radiation point from among the candidates for a point to be the radiation point based on the time information on the Cherenkov event acquired at Step S110. That is, for example, in a case in which the point 13a is the true radiation point in FIG. 10, the Cherenkov light reaches the point 21b earlier than the point 21a, so that a time of an event related to the point 21b becomes earlier than a time of an event related to the point 21a. In contrast, in a case in which the point 13b is the true radiation point, the Cherenkov light reaches the point 21a earlier than the point 21b, so that the time of the event related to the point 21a becomes earlier than the time of the event related to the point 21b. That is, the processing circuit 150 specifies, by the specification function 150d, a candidate for a point to be the radiation point on a side that the Cherenkov light reached earlier as the true radiation point based on the time information on the Cherenkov event.

Regarding the specifying of the radiation point at this step, a case of specifying the generation position of the charged particle based on geometric calculation is described, but the embodiment is not limited thereto. The processing circuit 150 may specify, by the specification function 150d, the generation position of the charged particle using machine learning such as a deep neural network (DNN).

Subsequently, at Step S140, the processing circuit 150 estimates, by the specification function 150d, an incidence angle of the gamma ray based on the transferred energy $E_e$ estimated at Step S100 and a scattering model.

Figure 11:
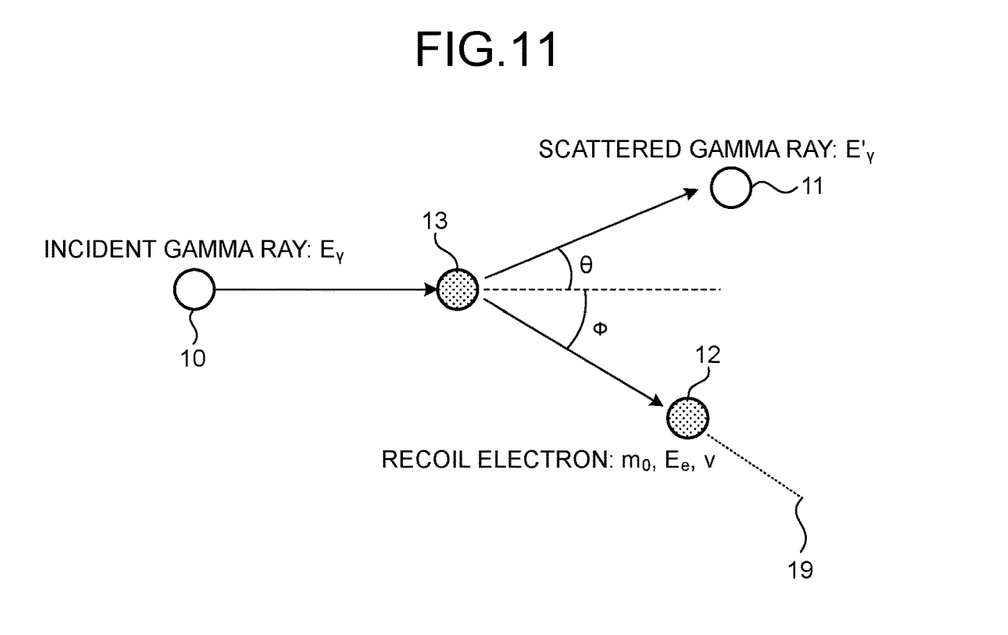
FIG. 11 is a diagram for explaining processing performed by the radiation detection device according to the embodiment.

FIG. 11 illustrates a relation among the incident gamma ray 10, the scattered gamma ray 11, and the recoil electron 12 again. As illustrated in FIG. 11, when the incident gamma ray 10 causes Compton scattering or the like at the generation point 13 of the charged particle, the scattered gamma ray 11 and the recoil electron 12 are generated as a result. Herein, according to the Klein-Nishina formula, the following expression (3) and expression (4) are established.

$$E'_\gamma = \frac{E_\gamma}{1 + \frac{E_\gamma}{m_0 c^2}(1 - \cos\theta)} \quad (3)$$

$$E_e = \frac{E_\gamma}{1 + \frac{m_0 c^2}{E_\gamma}(1 - \cos\theta)} \quad (4)$$

Herein, $E\gamma$ is energy of the incident gamma ray, and $E'\gamma$ is energy of the scattered gamma ray. The energy of the incident gamma ray is known, so that the processing circuit 150 can calculate, by the specification function 150d, a scattering angle θ of the gamma ray based on the transferred energy $E_e$ estimated at Step S100 and the expression (4). The processing circuit 150 can calculate, by the specification function 150d, a scattering angle φ of the recoil electron illustrated in FIG. 11 based on the momentum conservation law and the energy conservation law. Thus, the processing circuit 150 can calculate, by the specification function 150d, an angle formed by an incident direction of the incident gamma ray and the traveling direction of the recoil electron. In other words, the processing circuit 150 can specify, by the specification function 150d, the incident direction of the incident gamma ray and the traveling direction of the recoil electron.

Figure 12:
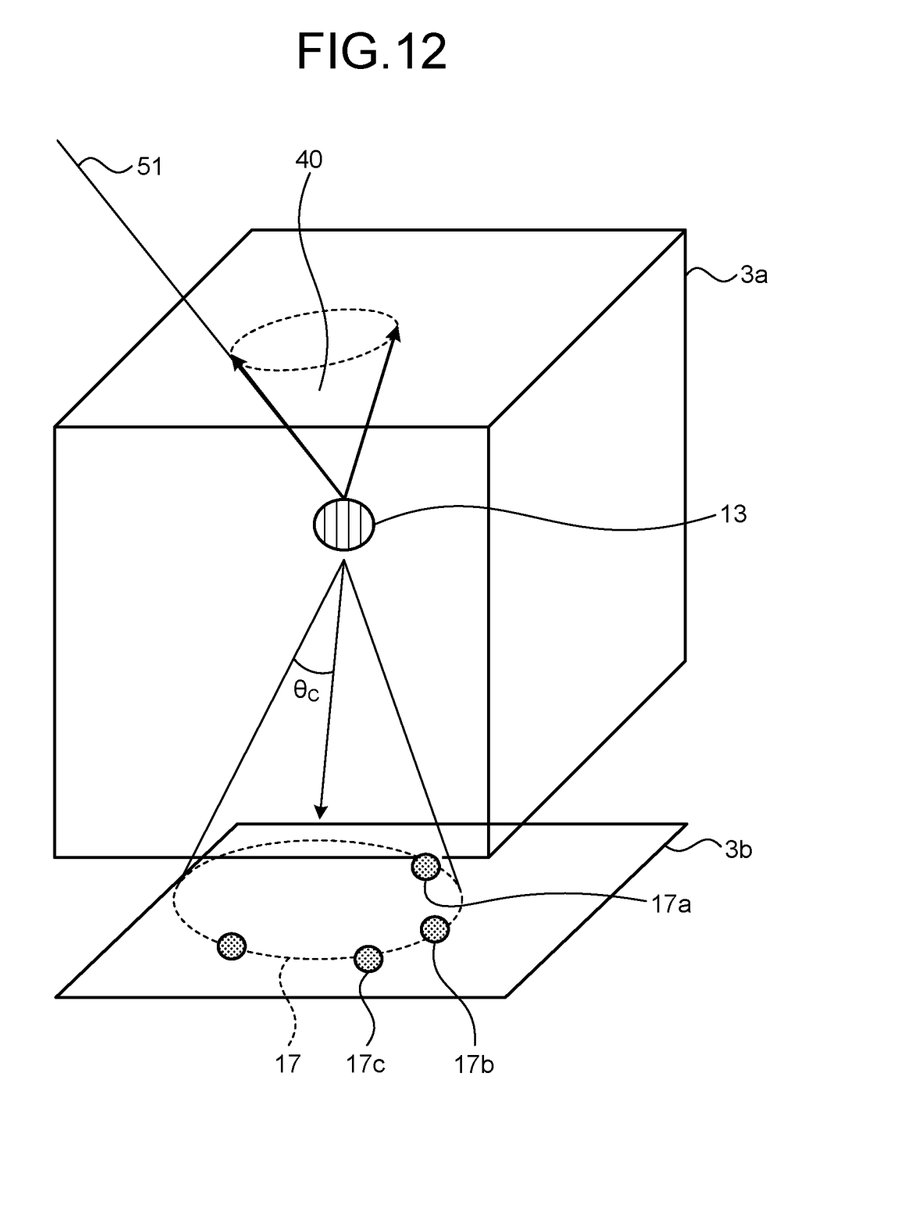
FIG. 12 is a diagram for explaining processing performed by the radiation detection device according to the embodiment.

FIG. 12 illustrates such a situation. In FIG. 12, in a case in which the gamma ray is incident on the scintillator crystal 3a, the Cherenkov light caused by the charged particle generated at the generation point 13 of the charged particle is detected by the light detection face 3b, and the pieces of position distribution information 17a, 17b, 17c, and so on are obtained, the processing circuit 150 specifies that a possible direction as the incident direction of the incident gamma ray is a direction indicated by a cone 40 by the specification function 150d. As an example, in FIG. 12, a direction indicated by a straight line 51 on the cone 40 is a possible direction as the incident direction of the incident gamma ray. In this way, the processing circuit 150 specifies, by the specification function 150d, a range of the incident direction of the gamma ray based on the specified radiation point of the Cherenkov light.

Subsequently, at Step S150, the processing circuit 150 removes or corrects, by the specification function 150d, a LOR due to scattering of the pair annihilation gamma rays based on the radiation point of the Cherenkov light specified at Step S140. Specifically, the processing circuit 150 removes or correct, by the specification function 150d, a line of response (LOR) due to multiple scattering while considering a cone defining a range within which the incidence angle of the gamma ray specified at Step S140 may fall. Such a situation is illustrated in FIG. 13.

Figure 13:
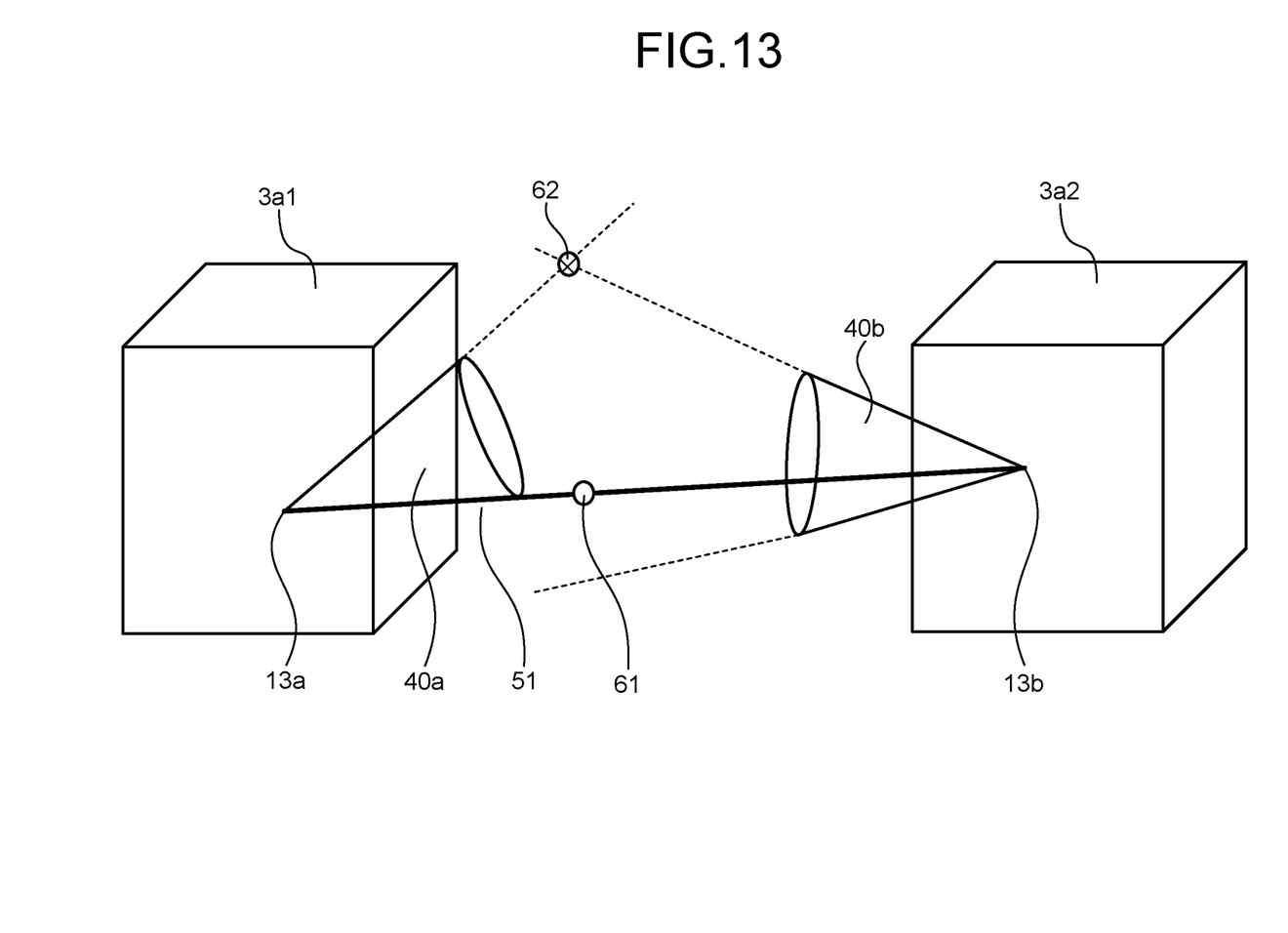
FIG. 13 is a diagram for explaining processing performed by the radiation detection device according to the embodiment.

In FIG. 13, a generation point of a charged particle generated in a scintillator crystal 3a1 is assumed to be the point 13a, and a generation point of a charged particle generated in a scintillator crystal 3a2 is assumed to be the point 13b. At Step S140, the processing circuit 150 specifies, by the specification function 150d, that a direction in a range defined by a cone 40a is an incident direction of the gamma ray related to the charged particle generated at the point 13a, and a direction in a range defined by a cone 40b is an incident direction of the gamma ray related to the charged particle generated at the point 13b. At Step S150, the processing circuit 150 removes or corrects, by the specification function 150d, the LOR due to multiple scattering while collectively considering these pieces of information specified at Step S140. For example, the processing circuit 150 determines, by the specification function 150d, a pair annihilation point 61 of the specified gamma ray is appropriate as a pair annihilation point of the gamma ray because trajectories of gamma rays emitted from the pair annihilation point in opposite directions fall within the cone 40a and the cone 40b, respectively. On the other hand, regarding a pair annihilation point 62, in a case in which one of the gamma rays emitted from the pair annihilation point in opposite directions falls within the cone 40a, the other gamma ray does not fall within the cone 40b, and in a case in which one of the gamma rays falls within the cone 40b, the other gamma ray does not fall within the cone 40a. Due to this, it is determined that this pair of gamma rays is causing multiple scattering with high possibility, and the LOR is removed and corrected.

As described above, the radiation detection device according to the embodiment includes the measurement unit that measures the transferred energy when scintillation is caused after a gamma ray incident on a scintillator generates Cherenkov light, and the estimation unit that estimates the Cherenkov angle based on the transferred energy. Due to this, a value of the transferred energy can be measured in addition to effects of Compton scattering or the like, so that the Cherenkov angle can be estimated with high accuracy for each event, and estimation accuracy for the light emission point can be improved. Furthermore, a motion direction of the electron and the scattering angle of the scattered gamma ray can also be estimated, and based thereon, the incident direction of the gamma ray can be estimated, and a scattered ray can be corrected or removed.

According to at least one embodiment described above, image quality can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation detection device comprising:
    a scintillator;
    a detector configured to detect a first light corresponding to Cherenkov light generated by incidence of a gamma ray into the scintillator and a second light generated after the first light has been generated by incidence of the gamma ray into the scintillator; and
    a processing circuit configured to
        measure transferred energy based on a detection result of the second light detected by the detector, the transferred energy corresponding to energy of the second light when scintillation by which the second light is generated is caused,
        estimate a Cherenkov angle based on the transferred energy, and
        specify a radiation position corresponding to a position where the first light is generated based on the estimated Cherenkov angle and a position on the detector where the first light is detected.

2. The radiation detection device according to claim 1, wherein the processing circuit is configured to acquire pieces of position distribution information on Cherenkov events detected when the first light is generated, specify a radiation point of the first light based on the Cherenkov angle, estimate a number of generated Cherenkov photons based on a detector output signal after the gamma ray is incident on the scintillator, and acquire the position distribution information based on an estimated number of Cherenkov photons.

3. The radiation detection device according to claim 2, wherein the processing circuit is configured to acquire pieces of position distribution information on Cherenkov events detected when the Cherenkov light is generated, and specify a radiation point of the Cherenkov light based on the Cherenkov angle and the position distribution information.

4. The radiation detection device according to claim 2, wherein the processing circuit is configured to acquire the position distribution information by specifying the Cherenkov events to be acquired based on time information.

5. The radiation detection device according to claim 2, wherein the processing circuit is configured to estimate the number of Cherenkov photons by performing fitting the detector output signal as a function of time to a theoretical curve, and is configured to measure the transferred energy based on a result of the fitting.

6. The radiation detection device according to claim 2, wherein the processing circuit is configured to estimate the number of Cherenkov photons based on the detector output signal in a period from an estimated time of a time at which the first light is generated to a first time, and is configured to measure the transferred energy based on the detector output signal on or after the first time.

7. The radiation detection device according to claim 2, wherein the processing circuit is configured to specify an incident direction of the gamma ray based on the specified radiation point of the first light.

8. The radiation detection device according to claim 2, wherein the processing circuit is configured to remove or correct a line of response (LOR) due to scattering of a pair of annihilation gamma rays based on the specified radiation point of the first light.

9. A radiation detection method comprising:

detecting, by a detector, a first light corresponding to Cherenkov light generated by incidence of a gamma ray into a scintillator and a second light generated after the first light has been generated by incidence of the gamma ray into the scintillator, measuring transferred energy based on a detection result of the second light detected, the transferred energy corresponding to energy of the second light when scintillation by which the second light is generated is caused, estimating a Cherenkov angle based on the transferred energy, and specifying a radiation position corresponding to a position where the first light is generated based on the estimated Cherenkov angle and a position on the detector where the first light is detected.

* * * * *